United States Patent [19]

Benjamin

[11] 4,177,831
[45] Dec. 11, 1979

[54] FLEXIBLE TIME DELAY VALVE

[75] Inventor: Benjamin C. Benjamin, Flint, Mich.

[73] Assignee: Schmelzer Corporation, Durand, Mich.

[21] Appl. No.: 827,456

[22] Filed: Aug. 25, 1977

[51] Int. Cl.² ............................................. F16K 15/14
[52] U.S. Cl. ................................ 137/513.5; 137/85 A
[58] Field of Search ............................. 137/513.5, 854

[56] References Cited

U.S. PATENT DOCUMENTS

| | | | |
|---|---|---|---|
| 2,571,893 | 10/1951 | Kendall | 137/854 X |
| 2,662,723 | 12/1953 | Coffey | 137/854 |
| 2,775,363 | 12/1956 | Taylor . | |
| 2,936,779 | 5/1960 | Kindred | 137/854 |
| 3,159,176 | 12/1964 | Russell et al. . | |
| 3,454,182 | 7/1969 | Morton | 137/513.5 X |
| 3,851,588 | 12/1974 | Taylor | 137/854 X |
| 3,931,830 | 1/1976 | Gritz | 137/513.5 X |

FOREIGN PATENT DOCUMENTS 1475963 7/1969 Fed. Rep. of Germany ........... 137/854

*Primary Examiner*—William R. Cline
*Attorney, Agent, or Firm*—Fisher, Gerhardt & Groh

[57] ABSTRACT

A time delay valve of flexible material to be supported in an opening in a wall and having a body member provided with a recess permitting the use of a tool to position the valve in the opening in the wall from one side of the wall with the recess also accommodating displaced material during the time that the valve is being installed. The valve has an enlarged head which closes the opening and flexes away from the wall to open and permit relatively free fluid flow. A metering groove extends radially of an annular sealing surface formed on the perimeter of the head to restrict and delay fluid flow when the valve is in a closed position relative to the wall.

2 Claims, 3 Drawing Figures

FLEXIBLE TIME DELAY VALVE

This invention relaties to flexible control valves and more particularly to time delay valves which limit fluid flow in one direction and permit relatively free fluid flow in the opposite direction.

Various forms of flexible check valves have been provided and are used in installations in which assembly is difficult particularly when the valves are of small size. In certain vacuum servo motors of the type used to control functions of a carburetor it is customary to use time delay valves but the vacuum servo motors are so small that often the valve itself is little more than a fraction of an inch in diameter. Within such installations the valve protrudes through an opening in a wall. One method of assembly is such that the valve is formed with an elongated stem so that the elongated portion is inserted through the opening from one side of a wall and a tool is used to pull the valve into position from the other side of the wall. Subsequently the excess material of the stem can be removed. This is particularly wasteful of material and requires access from both sides of the wall in which the opening is located.

It would be highly desirable and is an object of the invention to provide a check valve which can be installed in an opening from one side of the wall.

Another object of the invention is to provide a check valve which is adapted to be seated in an opening in a wall in which the portion of the valve disposed within the wall forms a recess permitting the insertion of a tube and also provides a space to temporarily receive portions of the valve which are being distorted as they move through the opening.

A valve for controlling fluid communication through an opening in a wall has been provided wherein the valve has a body of resilient material with a head portion disposed at one side of a wall and larger in size than the opening so that engagement of the head with the wall closes the opening. The valve is held in position by a central stem which extends through the opening but at the same time permits fluid passage. The central stem is provided with a stop portion which is larger than the opening and engages the opposite side of the wall from the head portion. The stem itself is hollow and forms a flat bottom portion on the interior of the hollow stem against which a force can be applied to push the valve through the opening in the wall. Also the recess forms a space which temporarily accommodates material of the valve as it is distorted and displaced upon movement of the valve through the opening in the wall. The head of the valve is flexible and moves into and out of engagement with the wall upon changes in pressure at opposite sides fo the wall.

These and other objects of the invention will be apparent from the following description and from the drawings in which.

Figure 1:
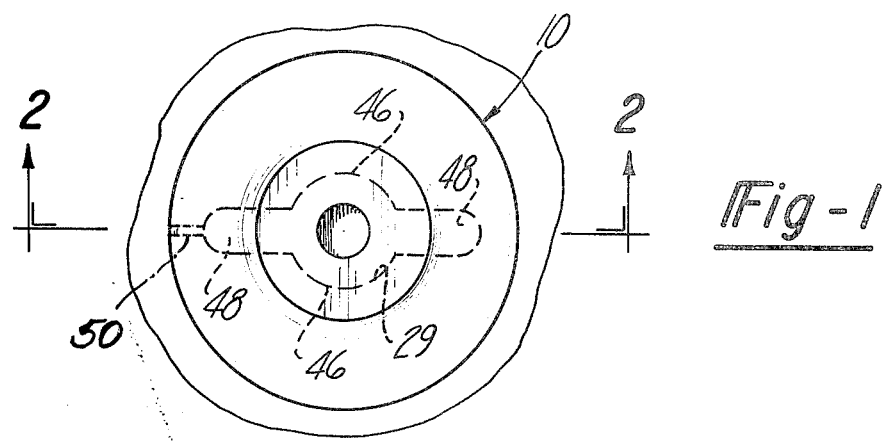
FIG. 1 is a top plan view of the valve shown in position relative to a portion of the wall.

Referring to the drawings the valve assembly 10 of the present invention is of a type which can be used in a vacuum servo motor 12 including a housing 14 in which a diaphragm assembly 16 is supported to reciprocate an output member 18. One end of the housing 14 is provided with an interior wall 20 which supports the valve 10. One side of the wall 14 is in communication with an inlet tube 22 connected to a source of vacuum such as the intake manifold of an automobile. The other side of the wall 20 forms a chamber 24 adjacent to the diaphragm which is in communication with the tube 22 through the valve 10.

Figure 3:
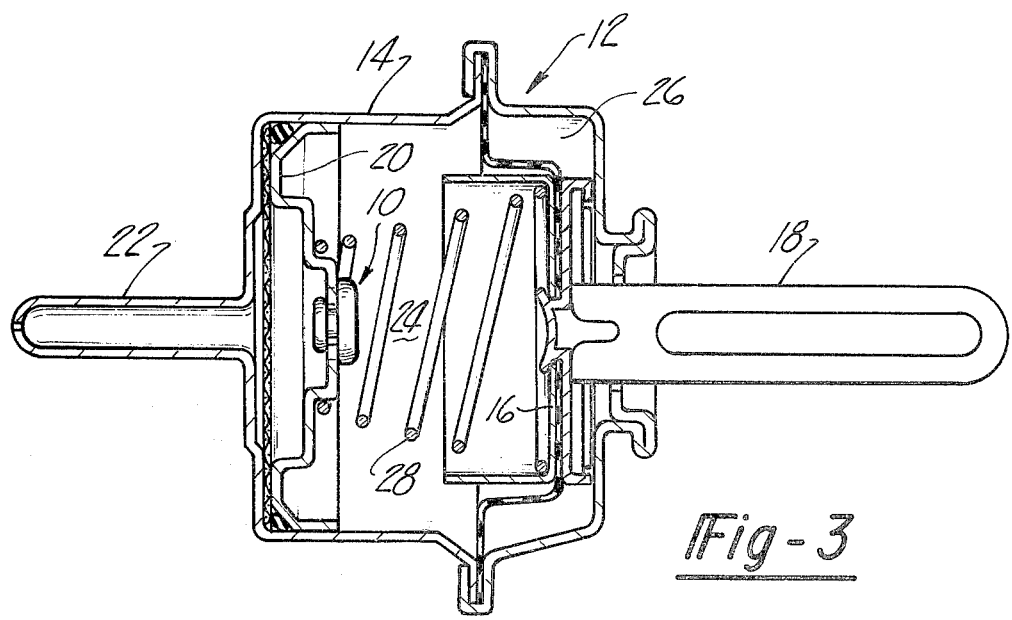
FIG. 3 is a cross-sectional view of a vacuum servo motor illustrating an application for the valve.

In operation of the vacuum servo motor 12 the various cavities in the housing 14 will be under atmospheric pressure. When the engine of the vehicle is started manifold vacuum pressure becomes available at the inlet tube 22 and the function of the valve 10 is to admit vacuum at a restricted rate to the chamber 24 so that over a period of several seconds vacuum pressure is established in the chamber 24 at the left side of the diaphragm assembly 16 as viewed in FIG. 3. Atmospheric pressure is maintained on the other side of the diaphragm assembly 16 in a chamber 26 so that the diaphragm assembly moves against the action of a spring 28 to move the output member 18.

When the source of vacuum at the inlet tube 22 is terminated as by stopping the engine, atmospheric pressure is established in the tube 22. Vacuum pressure existing in the chamber 24 creates a pressure differential causing the valve 10 to open fully and equalize pressure at said opposite sides of the wall 20. Such equalization results in movement of the diaphragm assembly 16 towards the wall 20 to retract the output member 18.

Figure 2:
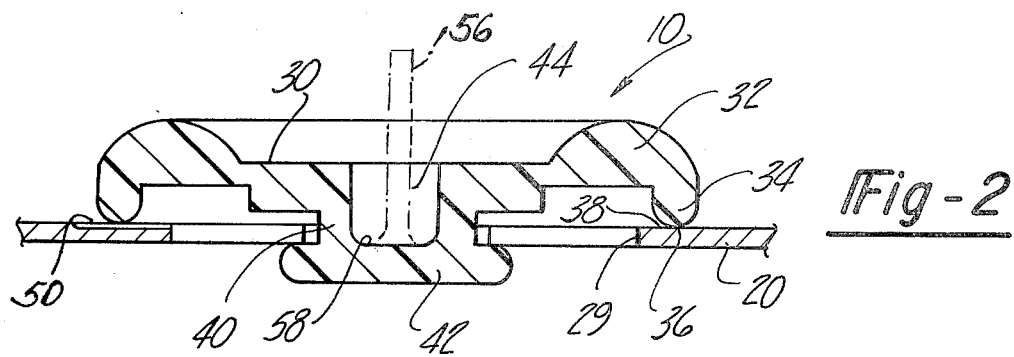
FIG. 2 is a cross-sectional view taken on line 2—2 in FIG. 1.

The valve 10 is disposed in an opening 29 in the wall 20 and includes a body member 30 formed of resilient rubber like material and typically is molded as a single, unitary element. The body member 30 is generally circular and has a head portion 32 the outer circumference of which is provided with a sealing bead 34 having an annular narrow sealing surface 36 adapted to engage a complementary annular sealing surface 38 on the wall 20. The sealing surface has a semicircular cross section as seen in FIG. 2 and acts in the manner similar to an O-ring when it is seated on the wall 20.

A central stem 40 extends axially from the head portion 22 and terminates in a disc shaped stop portion 42. The stem portion 40 and adjoining head portion 32 form a recess 44 so that the portion of the stem 40 extending from the under surface of the head portion 22 and the stop portion 34 forms a tube.

In the installed condition, the body member 30 is disposed in the opening 29 in the wall 20. The opening 29 is similar to a key hole in that the central portion of the opening is generally circular with diametrically opposed arcuate portions 46 separated by diametrically opposed elongated portions 48. When the valve body 30 is positioned in the wall 20, the stem 40 occupies the opening formed by the arcuate portions 46 and the elongated portions 38 permit fluid passages from one side of the wall 20 to the other.

The valve body member 30 is restrained in position by the stop portion 42 and preferably the thickness of the wall 20 is equal or less than the distance between the stop portion 42 and the under surface of the head portion 32.

In the application of the valve arrangement for use in vacuum servo motors in which unrestricted flow is afforded in one direction under high differential pressures and in which restricted flow is to be afforded in the opposite direction, a metering groove 50 is provided in the surface of the wall to extend under the annular seal surface 36 and radially of the head portion 22. Such an arrangement permits the valve body member 30 to remain in position illustrated with the annular seal surface 36 in engagement with the sealing surface 38 on the wall 20 and so that fluid passage between the chambers 26 and 28 must occur through the metering groove 50 and the elongated portions 48 of the opening 12. Upon establishment of a high pressure in tube 22 and low pressure in chamber 24 fluid flow cannot be accommondated through the metering groove 50 and the outer annular portion 42 of the valve body member 30 flexes upwardly from the position shown in the drawings so that the annular seal surface 36 separates from the wall sealing surface 28 and permits relatively free flow of fluid from chamber 24 to inlet tube 22. Upon pressures in the chamber 24 and tube 22 approaching equalization, the annular seal surface 26 returns to its sealing position and any further fluid flow must occur through the metering groove 50.

Although the valve 10 of the present invention is intended to act as a time delay or metering valve the valve also could be used as a one way check valve by the elimination of the metering groove 50. In that case the valve 10 prevents fluid flowing from the chamber 24 to the tube 22 when high pressure exists in the chamber 24 but permits fluid flow in the opposite direction upon establishment of a higher pressure in tube 22 than in the chamber 24.

Since the valve 10 is a single body, its installation in the opening 29 of wall 20 requires compression of various portions of the valve or temporary displacement of portions of the valve. In the illustrated embodiment of the invention, the recess 44 permits the insertion of a tool indicated in phantom line at 56 so that upon alignment of the body member 30 with the opening 29, the tool 56 may be used to exert a force on the bottom flat wall portion 58 of the recess to push the valve body through the opening 29. Portions of the valve body member 30 collapse or fold into the recess 44 and extend into the elongated openings 48 so that the valve body member 30 is rather easily installed in the opening 29 of the wall 20.

A valve arrangement has been provided in which a unitary valve body member 30 is formed of resilient rubber like material and is installed in a key hole type opening in a wall separating fluid pressure chambers by pushing a portion of the valve through the opening in the wall. The valve is provided with a recess which accommodates a tool for the application of force so that the relatively flexible valve member may be pushed through the opening during installation. Once installed, the valve serves to restrict fluid flow in one direction and permits relatively free fluid flow in the opposite direction.

I claim:

1. A time delay valve for controlling fluid communication through an opening in a wall and allowing communication from one side of said wall to the other but restricting flow in the opposite direction, the combination comprising; a body of resilient material having a disc shaped head adapted to be disposed at one side of said wall, said opening have a central portion and diametrically opposed elongated portions extending radially from said central portion, said head being larger in diameter than said opening and disposed in engagement with said wall to close said opening, a central stem protruding through said central portion of said opening and permitting fluid passage through said elongated portions of said opening, a disc shaped stop portion forming part of said stem and having a continuous annular portion larger than said central portion of said opening and requiring deflection upon insertion of said valve in said opening, said stem having an axially extending recess closed at one end by said stop portion, said valve being insertable in said opening upon the application of force in said recess and on said stem to push said valve through said opening from one side of said wall, said recess and said elongated portions accommodating displaced material of said valve during its insertion in said wall, said head having an annular bead formed at the circumferential edge of said head to form a sealing surface, said sealing surface having a semi-circular cross section forming a relatively narrow sealing surface and being engageable with a complementary flat sealing surface on said wall, a metering groove in said wall extending radially from said opening beyond said bead, said head being flexible and movable out of engagement with said wall surface to permit fluid flow in one direction through said opening and being engageable with said wall to limit fluid flow through said metering groove and said opening in the opposite direction.

2. The combination of claim 1 wherein said metering groove extends from one of said elongated portions of said opening and beyond said bead.

* * * * *